May 21, 1957

R. A. CAPGRAS 2,792,913

PORTABLE ELEVATING SYSTEM, IN PARTICULAR FOR MOTOR VEHICLES

Filed April 25, 1952

Inventor
R. A. Capgras
By Hauck Downing Rubell
Attys

May 21, 1957 R. A. CAPGRAS 2,792,913
PORTABLE ELEVATING SYSTEM, IN PARTICULAR
FOR MOTOR VEHICLES
Filed April 25, 1952 7 Sheets-Sheet 2

Inventor
R. A. Capgras
By Emmert Downing Diebold
Attys.

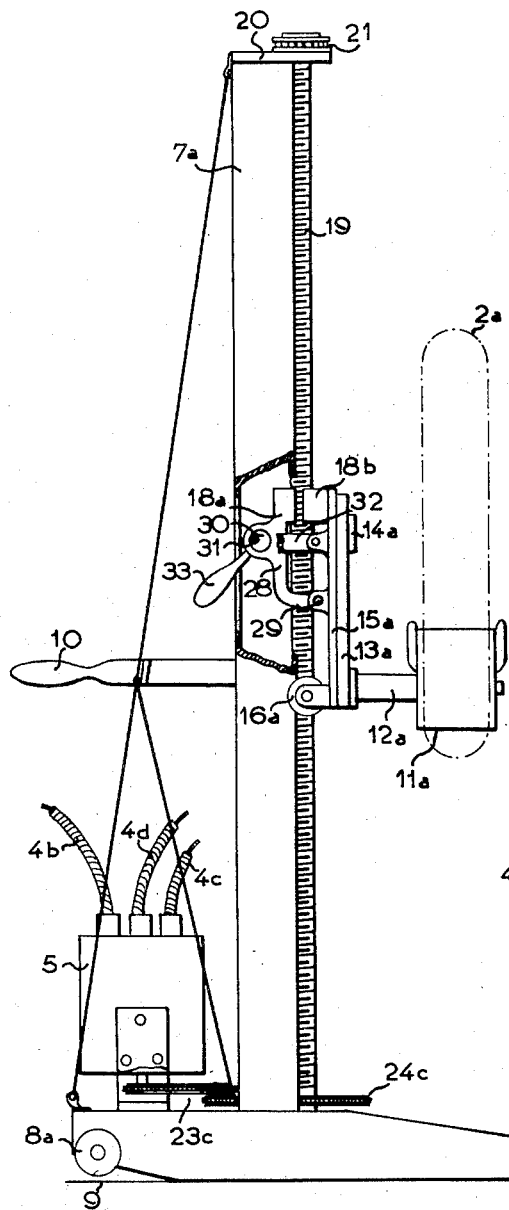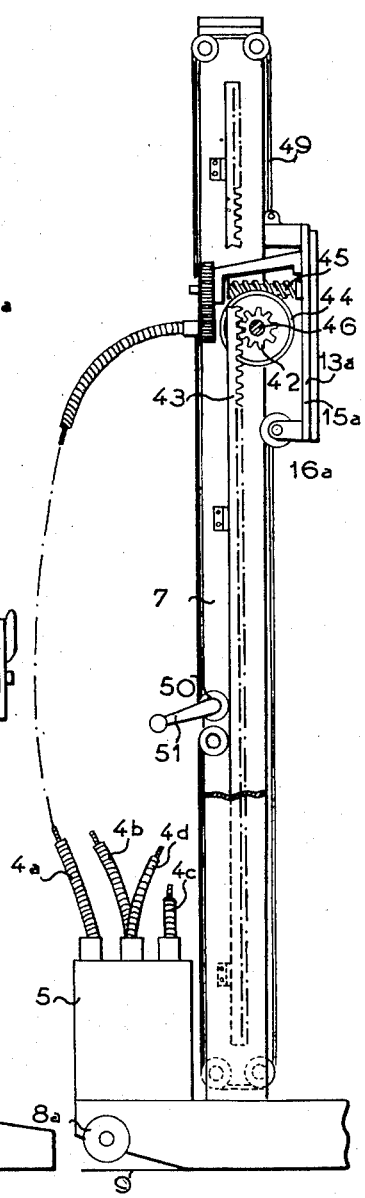

May 21, 1957 — R. A. CAPGRAS — 2,792,913
PORTABLE ELEVATING SYSTEM, IN PARTICULAR
FOR MOTOR VEHICLES
Filed April 25, 1952 — 7 Sheets-Sheet 4

Inventor
R. A. Capgras
Attys

May 21, 1957  R. A. CAPGRAS  2,792,913
PORTABLE ELEVATING SYSTEM, IN PARTICULAR
FOR MOTOR VEHICLES
Filed April 25, 1952  7 Sheets-Sheet 5

Inventor
R. A. Capgras

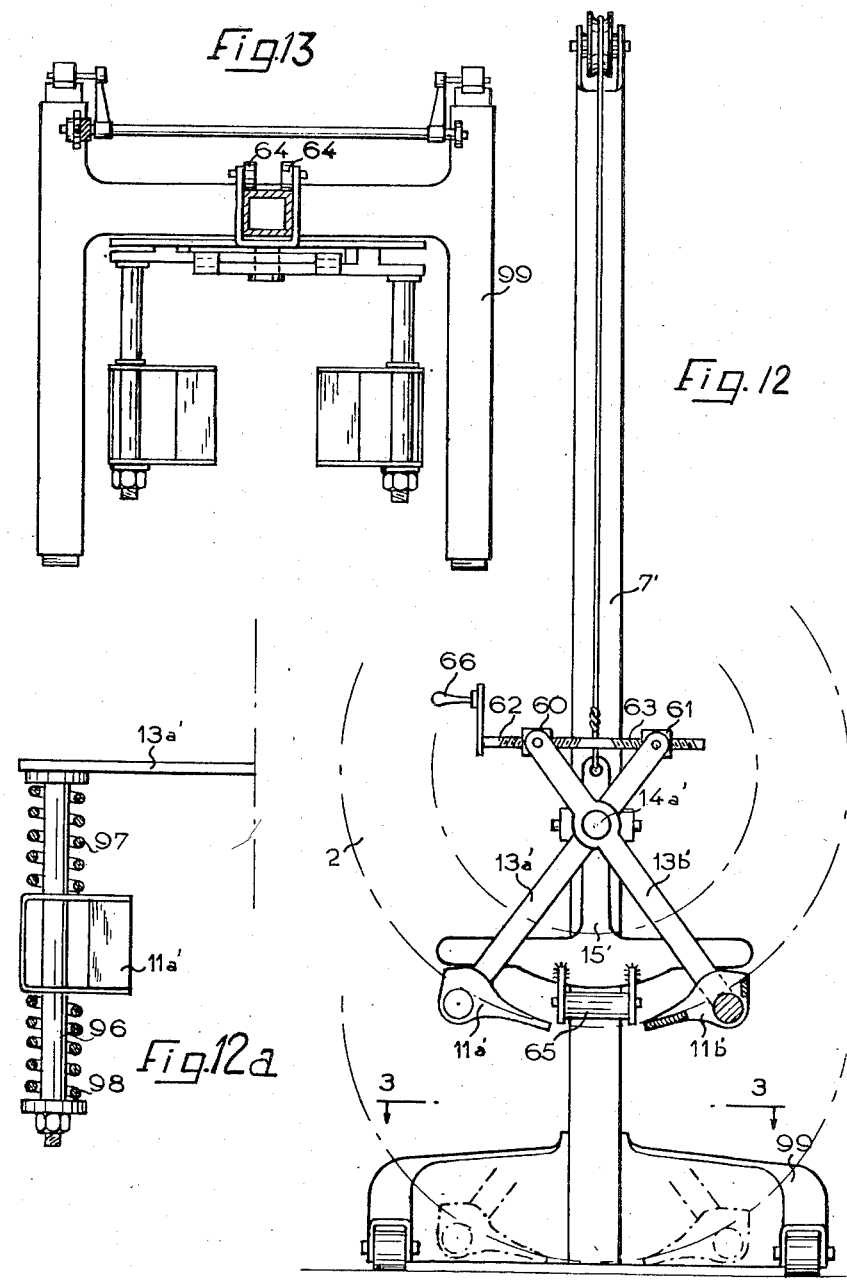

May 21, 1957 R. A. CAPGRAS 2,792,913
PORTABLE ELEVATING SYSTEM, IN PARTICULAR
FOR MOTOR VEHICLES
Filed April 25, 1952 7 Sheets-Sheet 7
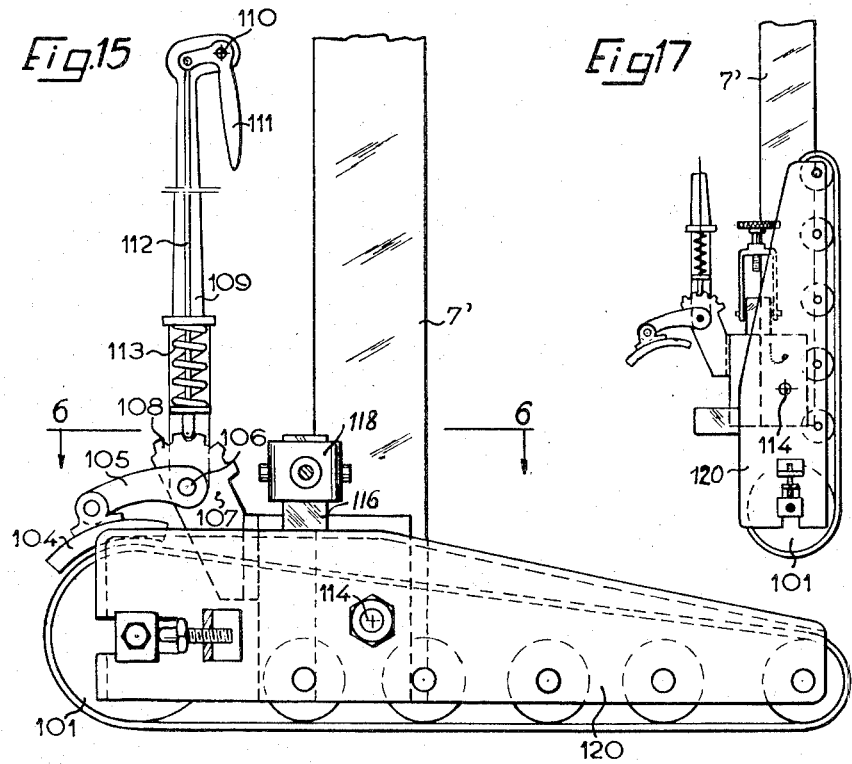
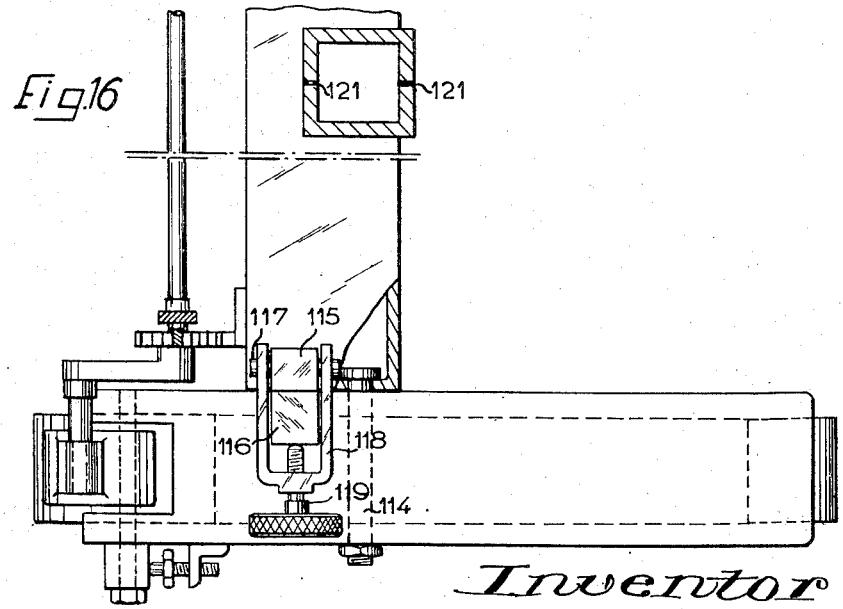
Inventor
R. A. Capgras

United States Patent Office 2,792,913
Patented May 21, 1957

2,792,913
PORTABLE ELEVATING SYSTEM, IN PARTICULAR FOR MOTOR VEHICLES

René A. Capgras, Paris, France

Application April 25, 1952, Serial No. 284,285

Claims priority, application France May 4, 1951

2 Claims. (Cl. 187—8.41)

My invention relates to apparatus for lifting road vehicles.

One object of the invention is to provide a portable set of mechanical lifting jacks adapted to be operatively interconnected to elevate a load in a generally vertical direction to a desired generally horizontal level.

Another object of the invention is to provide an apparatus for lifting a road vehicle by the combined action of several individually portable hoists, one of which comprises an actuating device drivingly connected to the hoist defining the actuating device and operatively connected to the other hoists by removable flexible shafts permitting transmission of rotary motion from the actuating device separately to each one of the other hoists.

The main advantage of the present apparatus is that no fixed installation such as pits, deep excavations, bridges or the like, generally used in the repair of motor vehicles is required.

The lifting apparatus has the further advantage of being constituted solely by portable elements whereby the apparatus may be easily moved to the location at which the vehicle is to be repaired, a procedure which is not possible with the known hydraulic installations.

My invention overcomes all known drawbacks existing in such hydraulic installations, and, particularly those resulting from fluid leakages.

A further aim of the invention is to provide normal conditions of lifting even though the surface supporting the lifting jacks is not truely horizontal.

Other aims, objects and advantages of the invention will become apparent to those skilled in the art from a reading of the ensuing description.

In describing the invention in detail, reference will be had to the accompanying drawings forming part of this application, wherein like reference characters denote corresponding parts in the several views, and, in which:

Fig. 4 is a side elevational view of the jack shown in Fig. 3, the view being partly broken away.

Figs. 5 and 6 are elevational views of two further forms of lifting jacks.

Fig. 12 is an end elevational view of the assembly shown in Fig. 11.

Fig. 12a is a detailed view of means providing free transverse relative displacement of the cradles with respect to the jack standards.

Fig. 13 is a plan view of the assembly shown in Fig. 12.

Fig. 15 is an elevational view of a further modification wherein the base is in the form of an endless track which can be swung upwardly.

Fig. 16 is a horizontal sectional view of Fig. 15, and

Fig. 17 is a view of the assembly of Fig. 15 with the base in its upwardly swung position.

Figure 1:
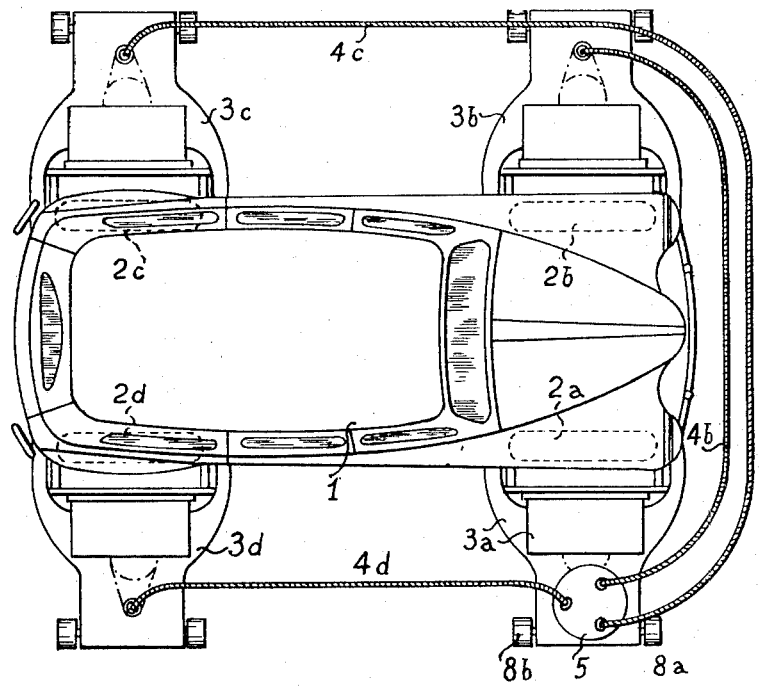
Fig. 1 is a plan view of a motor vehicle supported on the lifting apparatus of the present invention.

In Fig. 1, the lifting apparatus comprises four separate mechanical jacks 3a, 3b, 3c, and 3d, each of which serves to support a part or one of the four wheels 2a, 2b, 2c and 2d of a motor vehicle 1 to be raised to a desired horizontal level under the joint and synchronized action of all four jacks. To accomplish such ends, each of the jacks is provided with an elevating mechanism, with the mechanism acting upon lifting and supporting means adapted to receive one wheel of the vehicle.

To elevate the vehicle, each jack is positioned below the proper wheel, after which the four elevating mechanisms are mechanically interconnected by flexible shafts 4b, 4c and 4d rotated from a common driving member, such as motor 5 secured to one of the jacks and directly actuating the same, whereby the four wheels of the vehicle are elevated in unison.

The flexible shafts may be provided with suitable known detachable coupling means which can be in the nature of that shown in Fig. 11 as will be later described.

Figure 9:
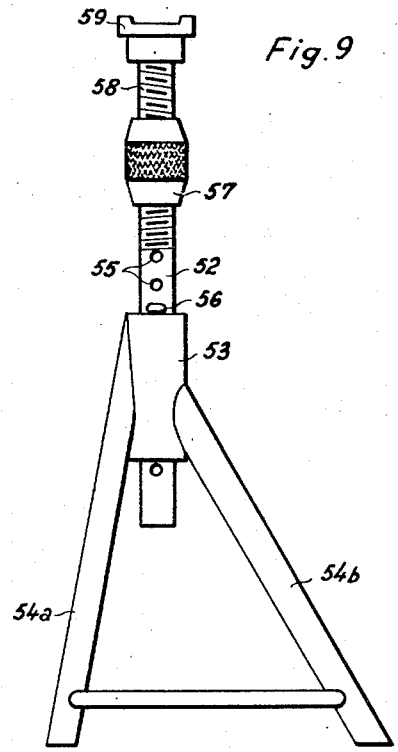
Fig. 9 is an elevational view of one of the supports to be used in lieu of the lifting jacks after the vehicle has been raised to the desired level.
Figure 10:
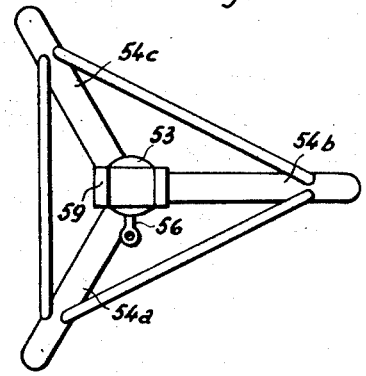
Fig. 10 is a plan view of the support shown in Fig. 9.

After the vehicle has been raised to the desired level, supports, such as shown in Figs. 9 and 10 may be substituted for the jacks 3a, 3b, 3c and 3d to allow such jacks to be removed for further use in raising another vehicle. Each of the supports includes a rod 52 slidably mounted in a sleeve 53 carried by a tripod 54a, 54b and 54c (Fig. 9). The rod is provided with holes 55 to allow the vertical position of the rod to be adjusted by the insertion of a key 56 into the proper hole 55. The upper threaded portion of the rod 52 is threaded into a knurled control bushing 57 which cooperates with an oppositely threaded screw 58 carrying supporting member 59 shaped to receive a suitable part of the motor vehicle. If the useful extension of the supporting member 59 is equal to one half the distance between two successive holes 55, the supporting member 59 may be brought itno accurate engagement with the selected part of the vehicle. After the vehicle is properly supported, the jacks can be easily and quickly removed. The jacks are again moved into position to lower the vehicle after the repairs have been effected and the supports removed.

Figure 2:
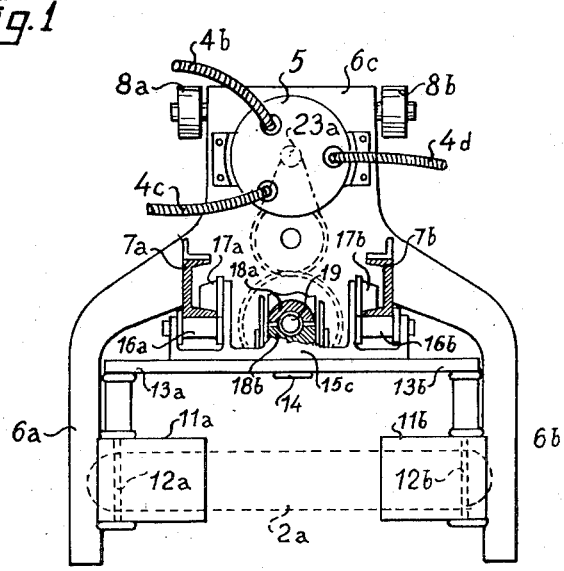
Fig. 2 is a plan view, partly broken away of one of the lifting jacks.
Figure 3:
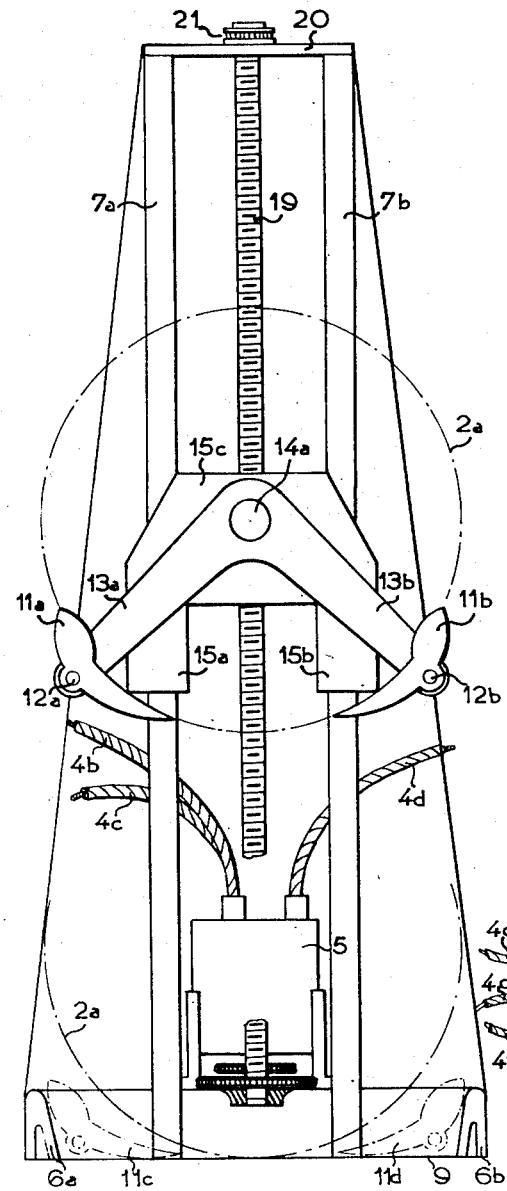
Fig. 3 is an elevational view of the jack shown in Fig. 2.

As shown in Figs. 2, 3 and 4, each jack includes a frame defined by a base 6a, 6b, and 6c and two standards 7a and 7b along which a movable carriage is guided. The base includes two arms 6a and 6b and a platform 6c interconnecting the arms and provided with wheels or the like 8a and 8b to facilitate movement of the jack along the ground. The platform 6c of the jack 3a also carries the motor 5, and on at least one of the jacks 3a, 3b, 3c and 3d, the wheels 8a and 8b are so designed that when the jack is in lifting position, the wheels do not support the main load applied to the jack, the load being directly transmitted to the ground 9 through the base 6a, 6b and 6c, at least a portion of which is then in contact with the ground.

The wheels or rollers 8a and 8b are so mounted and the lower face of the base is of such form that when the jack is in normal lifting position, the wheels are not in contact with the ground 9 but can be brought into engagement therewith by slightly tilting the jack. A handle 10 rigid with the standards 7a and 7b allows this to be easily accomplished when the jack does not support a load.

As shown in Fig. 3, two members 11a and 11b, hereinafter termed "cradles" which serve to receive and support a wheel, such as 2a, on either side of its initial point of contact with the ground, are freely pivoted at least between certain limits, on axles 12a and 12b, respectively. The axles are secured at right angles to arms 13a and 13b, respectively, and, the arms constitute a rigid bracket pivoted about a fulcrum 14a on movable carriage 15a, 15b and 15c which is guided along the standards 7a and 7b and suspended on elevating means. The standards are preferably U irons (Fig. 2) and the lower ends of upright members 15a and 15b of the carriage bear on the external faces of the outer sides of the standards through rollers 16a and 16b while the upper ends of the members bear on the internal faces of the standard outer sides through rollers 17a and 17b whereby the carriage is guided substantially in a vertical plane regardless of the action of the load applied to the cradles 11a and 11b. One of the rollers of each pair 16a and 17a and 16b and 17b is of frusto-conical shape to coact with the configuration of the outer sides of the U irons and attention is called to rollers 17a and 17b in Fig. 2.

The elevating means may be designed in any suitable manner and the only condition is that the carriage can be elevated by means of an irreversible lifting mechanism. Means are provided to declutch the elevating means, under suitable safety conditions, so that when the jack is not loaded, it is possible to use hand operated lifting or lowering means for the assembly. Reference is made to Fig. 4 wherein the carriage includes a nut member 18a and 18b which normally meshes with a threaded rod or shaft 19 of suitable length and which is in parallelism to the standards 7a and 7b.

The upper end of the shaft 19 is suspended by a cross member by means of bearing 21 and the lower end of the shaft is guided in a sleeve or the like (Fig. 3), the arrangement being such that the shaft does not rest on a lower bearing, so that when the cradles are loaded, the shaft is only subjected to tensile stresses. The threaded shaft 19 of one of the jacks is driven from motor 5 by any convenient positive transmission means, and, as shown in Figs. 2 and 4 through a reduction gear 23a and 23b, et cetera, interconnected by chains 23c and 24c.

Figure 8:
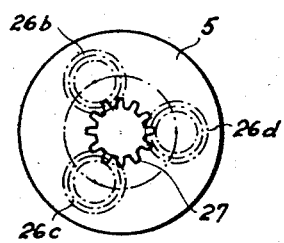
Fig. 8 is a diagrammatic plan view of the common driving motor of the lifting apparatus.

The flexible shafts 4b, 4c and 4d are fast with pinions 26b, 26c and 26d, respectively as can be seen in Fig. 8, and the pinions are driven by a further pinion 27 which latter pinion is in turn driven at a suitable speed from the motor 5. It is clear that the remaining three jacks are similar to that above described, except they each are driven by one of the flexible shafts.

The nut assembly 18a and 18b is in two parts and the inner shape of part 18b is that of a smooth cylindrical surface rigidly connected with the carriage 15a and 15b whereas part 18a is provided with an inner thread and is rigid with a lever 28 pivoted about fulcrum 29 carried by part 18b. A shaft 30 carrying an eccentric pin 31 is rotatable on lever 28 with the pin 31 being articulated to connecting rod 32 which rod in turn is articulated to the carriage 15a. Rotation of the shaft 30 by means of handle 33 thereby allows unmeshing of the nut part 18a from the threaded shaft 19 to thus effect the declutching operation.

Figure 5:
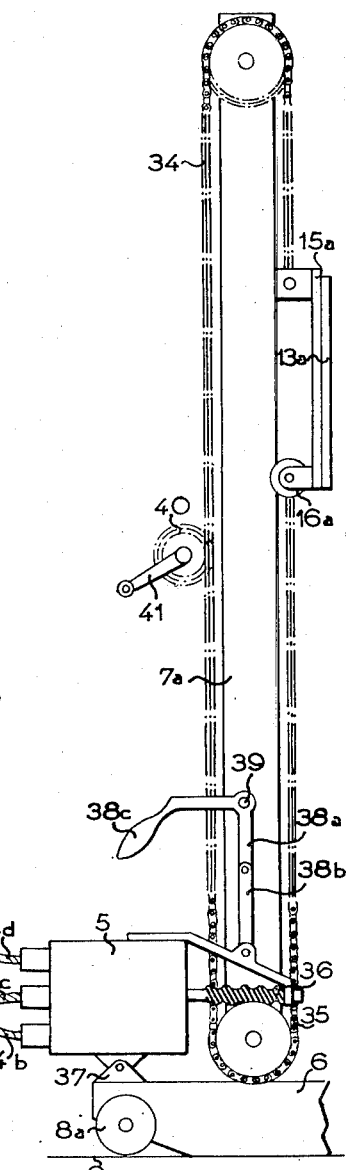

As shown in Fig. 5, the elevating carriage is actuated by an endless chain 34 which meshes with a toothed wheel keyed on the shaft of worm wheel 35 in mesh with a worm 36 rotated by motor 5, either directly for one jack or through one of the flexible shafts 4b, 4c and 4d for the other jacks.

In this form, the declutching is effected by directly unmeshing the worm 36 from the worm wheel 35, and, to accomplish this end, the motor is pivoted at 37 on base 6. Its position is determined by means of a linkage 38a, 38b, 38c with the member 38c being handle means pivoted at 39 to one of the standards 7a and 7b. When the unit is declutched, a rapid movement of the chain is effected by means of pinion 40 meshing with the chain and rotated by a hand wheel 41.

Referring to Fig. 6, the carriage is driven by a pinion 42 freely rotatable on axle 46 secured on the carriage with the pinion meshing with a rack 43 fixed on the standards. The pinion 42 is fast with worm wheel 44 meshing with a worm 45 mounted on the carriage and driven by motor 5, either through an additional flexible shaft or through one of the shafts 4b, 4c and 4d.

Figure 7:
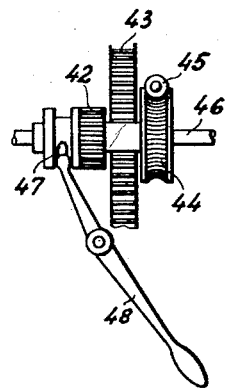
Fig. 7 is a detailed view of the declutching device for the elevating mechanism shown in Fig. 6.

To effect declutching, the pinion 42 is shifted along its axle (Fig. 7) to unmesh the pinion from the rack 43 and this shifting is controlled by a yoke 47 actuated by a hand lever 48. When the mechanism is declutched, the carriage may be rapidly operated through an endless chain or the like 49 driven by pulley 50 rotated by actuation of crank 51.

Figures 11, 14:
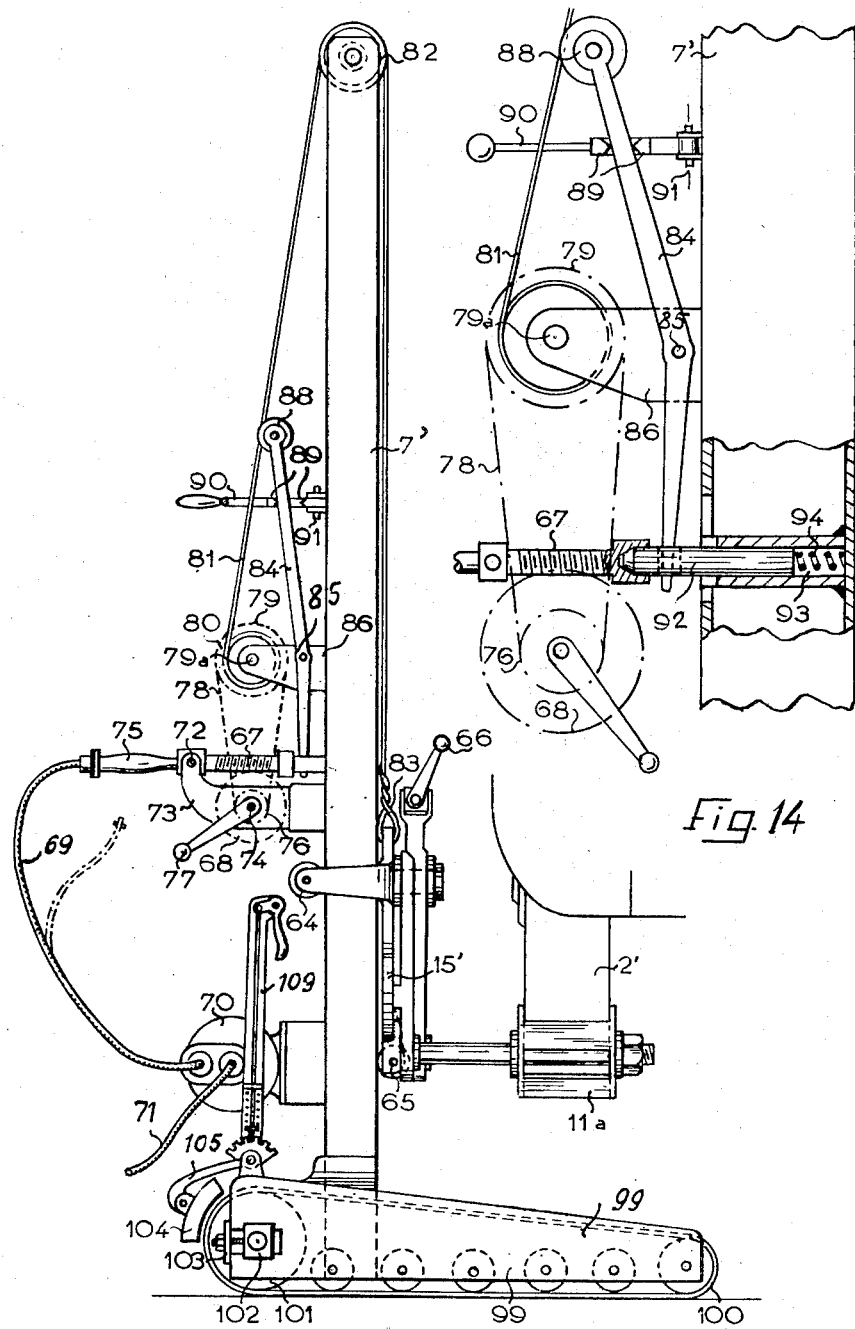
Fig. 11 is a side elevational view of a further embodiment of the invention.
Fig. 14 is an enlarged axial sectional view of the safety clutching mechanism shown in Fig. 11.

In Figs. 11 and 12, the supporting arms 13a' and 13b' of each jack are pivoted intermediate their ends at 14a' on a movable carriage 15' guided on a single standard 7' by an upper roller 64 and a lower roller 65 located on each side of the standard. The upper portions of the arms 13a' and 13b' are pivoted in turn on nuts 60 and 61 meshing with opposite threads 62 and 63 on a rod having a crank handle 66. With this assembly, it is possible to adjust the relative angular position of the arms 13a' and 13b' for supporting, in the best manner, wheels of different diameters, and, if the lower portion of the arms 13a' and 13b' are given a length greater than the maximum radius of the wheel to be lifted, the cradles may be brought into accurate position under the tire of the wheel with great ease. To this end, it suffices to increase the angle between the arms 13a' and 13b' with respect to their optimum relative angular position, to locate the cradles under the tire and to bring the arms to their optimum angular position again. Under these circumstances, it is clear that it is possible to dispose the four wheels on the saddles or cradles of the jacks with great accuracy prior to clutching the synchronized elevating mechanism.

The elevating mechanism includes a worm 67 meshing in the clutched position with a worm wheel 68 with the worm being rotated by the motor 5 through a flexible shaft 69, reduction gear 70 and a flexible shaft 71 similar to the shafts 4b, 4c and 4d. The shaft 69 of one of the jacks is driven through a reduction gear from the motor 5 which is secured on the jack. Worm 67 is tiltably secured at 72 to a stationary support 73 rigid with the standard 7' and on which is rotatably mounted as at 74, the worm wheel 68. A handle 75 is used to tilt the worm 67 about fulcrum 72 to declutch the synchronized driving mechanism. The worm wheel shaft also carries pinion 76 and a crank handle 77 by means of which the carriage can be rapidly moved when the driving mechanism is declutched. The pinion 76 drives a chain 78 which chain in turn drives toothed wheel 79 rotatably mounted at 79a to support 86 fixed on the standard 7'.

Also on the shaft of the wheel 79 is fixed drum 80 on which is wound a cable 81 which runs over pulley 82 at the top of the standard 7' and the other end of the cable is connected at 83 to the carriage 15'.

In Fig. 14 is shown the safety locking means which includes a lever 84 pivoted at 85 to support 86 and one end of the lever is operatively connected to a rod 92 located in an axial housing formed at the free end of worm 63 in the clutching position (Fig. 14). The rod 92 is slidably mounted in bore 93 of the standard 7' and is urged to the clutching position by spring 94.

At the other end of the lever 84 is provided a roller 88 on which runs the wound portion of the cable 81, and, as long as the cable 81 is subjected to the strain of a load, the lever 84 cannot be actuated.

A locking handle 90 pivoted at 91 to the standard 7' can be moved to engage the lever 84 at 89 to provide an added safety feature.

To provide lifting in normal condition even if the ground is not horizontal, means may be included to allow a certain relative displacement between the cradles and the standards as the load is elevated. This is assured longitudinally by the connection of the supporting arms on the movable carriage.

With reference to Fig. 12a, there is shown means allowing a certain freedom of transverse relative displacement of the cradles 11a' respecting the standard 7'. It can be seen that the cradles have a certain freedom of axial movement on their axles 96 and springs 97 and 98 located on each side of each cradle urge the same toward its medial axial position, and, if the ground is not level so that the standards are not truely vertical as the load is elevated, the cradles 11a' can freely slide on the rods 96 so that the normal distance is maintained between the cradles to prevent the loading from being displaced from the cradles.

These ends can also be accomplished by providing base 99 of each standard with an endless track 100 as shown in Figs. 11 and 15. Preferably one roller 101 of each endless track includes means to adjust the tension of the band such as a slide 102 cooperable with an adjusting screw 103. Furthermore, means are provided on each jack to hold the endless track stationary when required and such means comprises a brakeshoe 104 carried by one arm of a bell-crank lever pivoted at 106 (Fig. 15) to a support 107 rigid with the base 99 and which support is formed with a toothed sector 108. The other arm 109 of the lever is provided with a handle 111 connected to the upper end of the arm 109 as at 110. The handle controls a rod 112 which normally engages between adjacent teeth of the sector 108 by the action of a spring 113. When the handle is moved toward the arm 109, the end of the rod 112 is moved in an upward direction away from the sector 108.

With this arrangement, the endless track base 99 being disposed transverse and inward respecting the vehicle, it is sufficient to lock, by means of the above assembly, the endless tracks of the two jacks disposed on one side of the vehicle whereupon, as the vehicle is raised, the two other jacks move slightly transversely, if required, by the free movement of their endless tracks. Furthermore, with the endless tracks, it is much easier to move the jacks into an accurate position beneath the vehicle to be lifted.

The endless tracks may be fixed on the standards, or, as shown in Figs. 15 to 17, the tracks may be pivoted as indicated at 114 on the associated standard 7'. In this form, means are provided to lock the endless track in a position at right angles to the standard. Such means include two blocks, one of which 115 is fixed to the standard and the other 116 is rigid with the endless track. On block 115 is pivoted at 117, a stirrup member 118 so that in the Fig. 16 position, the block 116 is in contact with block 115 and can be held in this position, when the stirrup member is turned down by means of a screw 119 having a knurled head.

When the endless track is not locked, it can be swung upwardly to the position illustrated in Fig. 17 thereby allowing the jack to be easily rolled on the roller 101.

Of course, the track need not be moved to the precise position shown in Fig. 17 so long as it can roll on the roller 101. In addition, it will be appreciated that this arrangement permits the jacks to be relatively compact which is advantageous in shipment and storage.

In Figs. 11 to 17, the frame construction of the jack is quite simple and each frame is defined by a base 99 made of soft metal, such as soft cast iron of any suitable shape and a single light and rigid tubular standard 7' preferably formed by two butt welded U irons as shown at 121 in Fig. 16.

This invention is not to be confined to any strict conformity with the showings in the drawings but may be changed or modified so long as such changes or modifications mark no material departure from the salient features of the invention as expressed in the appended claims.

What is claimed is:

1. A portable apparatus for lifting a road vehicle comprising, in combination, a plurality of individually portable lifting jacks each having a base member supporting a standard, a carriage movable upwardly and downwardly along the standard, a lifting mechanism including a screw extending along said standard and rotatively suspended thereon operable to move the carriage upwardly or downwardly upon corresponding rotation of the screw, an actuating device mounted on one of said lifting jacks and comprising a drive shaft drivingly connected to the screw of the lifting jack carrying the actuating device, means including removable flexible shafts associated with the actuating device and connectible selectively to the screws of the other desired lifting jacks to permit transmission of rotary motion from said drive shaft separately to the screw of each of said desired other lifting jacks, a two part nut assembly carried by the carriage normally meshing with the screw and constituting a positive drive connection between the drive shaft and the carriage of each of said lifting jacks, means operatively connected with one of said nut parts to move such part out of engagement with the screw thereby defining means for interrupting the positive connection, and hand operated means for moving the carriage upwardly and downwardly independently of the drive shaft upon actuation of the positive connection interrupting means.

2. Apparatus according to claim 1, in which one nut part is internally threaded and the other part is smooth.

References Cited in the file of this patent

UNITED STATES PATENTS

| | | |
|---|---|---|
| 324,644 | Bouvier | Aug. 18, 1885 |
| 620,585 | Hayes | Mar. 7, 1899 |
| 936,948 | Russell | Oct. 12, 1909 |
| 1,101,598 | Weinke | June 30, 1914 |
| 1,436,808 | Jakorleff | Nov. 28, 1922 |
| 1,477,790 | Townsend | Dec. 18, 1923 |
| 2,099,636 | Weaver | Nov. 16, 1937 |
| 2,136,750 | Myers | Nov. 15, 1938 |
| 2,522,925 | Bristol | Sept. 19, 1950 |
| 2,612,057 | Gray | Sept. 30, 1952 |
| 2,655,223 | Villars | Oct. 13, 1953 |

FOREIGN PATENTS

| | | |
|---|---|---|
| 255,316 | Great Britain | July 22, 1926 |